(12) United States Patent
Wang et al.

(10) Patent No.: US 12,416,059 B2
(45) Date of Patent: Sep. 16, 2025

(54) PREPARATION METHOD OF GLASSLESS GRAIN-ORIENTED SILICON STEEL AND PRODUCT THEREOF

(71) Applicant: Shougang Zhixin Electromagnetic Materials (Qian'an) Co., Ltd., Tangshan (CN)

(72) Inventors: Xianhui Wang, Hebei (CN); Qian Gao, Hebei (CN); Maolin Sun, Hebei (CN); Jian Gong, Hebei (CN); Huiming Xiao, Hebei (CN); Zhaoyue Liu, Hebei (CN); Renhao Teng, Hebei (CN); Songshan Zhao, Hebei (CN); Zhiyuan Hu, Hebei (CN); Jiebin Qi, Hebei (CN); Xuechang You, Hebei (CN); Ruifeng Li, Hebei (CN); Donghe Song, Hebei (CN); Aixing Wang, Hebei (CN)

(73) Assignee: Shougang Zhixin Electromagnetic Materials (Qian'an) Co., Ltd., Hebei (CN)

( * ) Notice: Subject to any disclaimer, the term of this patent is extended or adjusted under 35 U.S.C. 154(b) by 482 days.

(21) Appl. No.: 17/816,654

(22) Filed: Aug. 1, 2022

(65) Prior Publication Data

US 2022/0364197 A1   Nov. 17, 2022

Related U.S. Application Data

(63) Continuation of application No. PCT/CN2021/129607, filed on Nov. 9, 2021.

(30) Foreign Application Priority Data

Dec. 17, 2020   (CN) .......................... 202011495799.8

(51) Int. Cl.

| | |
|---|---|
| *C21D 9/46* | (2006.01) |
| *C21D 1/28* | (2006.01) |
| *C21D 1/72* | (2006.01) |
| *C21D 1/76* | (2006.01) |
| *C21D 6/00* | (2006.01) |
| *C21D 8/12* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/42* | (2006.01) |
| *C22C 38/60* | (2006.01) |
| *H01F 1/147* | (2006.01) |
| *C21D 1/84* | (2006.01) |
| *C21D 3/04* | (2006.01) |

(Continued)

(52) U.S. Cl.
CPC ................ *C21D 9/46* (2013.01); *C21D 1/28* (2013.01); *C21D 1/72* (2013.01); *C21D 1/76* (2013.01); *C21D 6/008* (2013.01); *C21D 8/1222* (2013.01); *C21D 8/1233* (2013.01); *C21D 8/1255* (2013.01); *C21D 8/1261* (2013.01); *C21D 8/1283* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/42* (2013.01); *C22C 38/60* (2013.01); *H01F 1/147* (2013.01); *C21D 1/84* (2013.01); *C21D 3/04* (2013.01); *C21D 8/1205* (2013.01); *C21D 8/1227* (2013.01); *C21D 8/1238* (2013.01); *C21D 8/1244* (2013.01); *C21D 8/1272* (2013.01); *C21D 8/1277* (2013.01); *C21D 2201/05* (2013.01); *C22C 38/20* (2013.01); *C22C 38/34* (2013.01); *C22C 2202/02* (2013.01); *C23C 8/02* (2013.01); *C23C 8/26* (2013.01); *C23C 8/80* (2013.01); *H01F 1/18* (2013.01)

(58) Field of Classification Search
CPC ........................................................ C21D 9/46
See application file for complete search history.

(56) References Cited

U.S. PATENT DOCUMENTS

| | | | | |
|---|---|---|---|---|
| 4,875,947 A | * | 10/1989 | Nakayama | ............... C21D 1/70 148/112 |
| 2016/0020006 A1 | * | 1/2016 | Watanabe | ............. C22C 38/002 148/111 |
| 2016/0194731 A1 | * | 7/2016 | Han | ........................ C22C 38/04 148/111 |

FOREIGN PATENT DOCUMENTS

| | | |
|---|---|---|
| CN | 102952931 A | 3/2013 |
| CN | 104726668 A | 6/2015 |
| CN | 111302366 A | 6/2020 |

OTHER PUBLICATIONS

First Office Action of the Chinese application No. 2020114957998, issued on May 25, 2022.

* cited by examiner

*Primary Examiner* — Jophy S. Koshy
(74) *Attorney, Agent, or Firm* — Syncoda LLC; Feng Ma

(57) ABSTRACT

A preparation method of glassless grain-oriented silicon steel includes the following operations. During a decarburization annealing, a thickness of an oxide film on a surface of strip is 1.5-2.5 μm; an atomic weight ratio of Si element and Fe element in the oxide film satisfies: Si/(Si+Fe)≥0.76; during a high-temperature annealing, a cooling stage includes sequentially: cooling with an inner cover when a temperature drops from 1200° C. to 500° C.; wherein a protective gas is a mixed gas containing nitrogen and hydrogen, and a volume percentage of the hydrogen in the mixed gas is >3%; cooling with the inner cover when the temperature drops from 500° C. to 200° C.; wherein the (Continued)

protective gas is nitrogen; and cooling in air by removing the inner cover when the temperature is <200° C.

15 Claims, No Drawings

(51) Int. Cl.
*C22C 38/20* (2006.01)
*C22C 38/34* (2006.01)
*C23C 8/02* (2006.01)
*C23C 8/26* (2006.01)
*C23C 8/80* (2006.01)
*H01F 1/18* (2006.01)

PREPARATION METHOD OF GLASSLESS GRAIN-ORIENTED SILICON STEEL AND PRODUCT THEREOF

CROSS-REFERENCE TO RELATED APPLICATIONS

This is a continuation application of International Application No. PCT/CN2021/129607 filed on Nov. 9, 2021, which claims priority to Chinese Patent Application No. 202011495799.8 filed on Dec. 17, 2020. The disclosures of these applications are hereby incorporated by reference in their entirety.

BACKGROUND

In a manufacturing process of conventional oriented silicon steel, strip needs to be decarburized and annealed after cold rolling, in which a layer of oxide film (mainly composed of $SiO_2$ and $Fe_2SiO_4$) is formed on a surface of the strip. Subsequently, a nitriding process is performed, during which N element penetrates into the surface of the strip through the oxide film. Afterwards, a layer of MgO is coated on surface of the strip to act as a separator. When the strip enters into a high-temperature annealing stage, the oxide film formed on surface of the strip reacts with MgO to form a forsterite bottom film, which is called a glass film. The glass film may increase an interlayer resistance on surface of the strip and provide a surface tension to improve magnetic properties of the strip. However, this glass film may result in poor punching performance of conventional oriented silicon steel. In addition, oxides of this glass film generated on surface of the strip may hinder the movement of magnetic domains, thereby further increasing iron loss to a certain extent.

SUMMARY

The disclosure relates to the technical field of silicon steel preparation, and specifically, to a preparation method of glassless grain-oriented silicon steel and a product thereof.

In view of the above problems, the disclosure provides a preparation method of glassless grain-oriented silicon steel and a product thereof. In the preparation method of glassless grain-oriented silicon steel according to some embodiments of the disclosure, by controlling the thickness of the oxide film formed on strip in the decarburization annealing stage as well as certain processes, such as a cooling stage in high-temperature annealing, etc., glassless grain-oriented silicon steel with good surface finishing, good surface homogenization, high yield and excellent magnetic properties is obtained.

The technical solution for achieving the above purpose of the disclosure is as follows.

In one aspect of the disclosure, a preparation method of glassless grain-oriented silicon steel is provided. The preparation method includes processes of steelmaking, continuous casting, casting slab heating, hot rolling, normalizing, cold rolling, decarburization annealing, nitriding, separator coating, high-temperature annealing, and hot stretch flattening and coating; wherein:

during the decarburization annealing, a thickness of an oxide film formed on a surface of strip is 1.5~2.5 μm; and an atomic weight ratio of Si element and Fe element in the oxide film satisfies: $Si/(Si+Fe) \geq 0.76$; and during the high-temperature annealing, a cooling stage includes sequentially:
cooling with an inner cover, when a temperature drops from 1200° C. to 500° C. wherein a protective gas is a mixed gas containing nitrogen and hydrogen, and a volume percentage of the hydrogen in the mixed gas is >3%;
cooling with the inner cover, when the temperature drops from 500° C. to 200° C.;
wherein the protective gas is nitrogen; and
cooling in air by removing the inner cover when the temperature is <200° C.

In the preparation method of glassless grain-oriented silicon steel as disclosed according to some embodiments of the disclosure, during the casting slab heating, a heating temperature is 1150° C.

In the preparation method of glassless grain-oriented silicon steel as disclosed according to some embodiments of the disclosure, the thickness of the oxide film formed on surface of the strip is 1.5~2.5 μm, which includes that:
the thickness of the oxide film formed on surface of the strip is 1.9~2.3 μm.

In the preparation method of glassless grain-oriented silicon steel as disclosed according to some embodiments of the disclosure, during the separator coating, a separator includes: a component A, a component B, a component C, and a component D;
wherein the component A is MgO, or the component A is a mixture containing MgO and $Al_2O_3$;
the component B is one or more selected from a group consisting of NaCl, KCl, $MgCl_2$, $ZnCl_2$, $BaCl_2$, $SrCl_2$, $MnCl_2$, $CaCl_2$, BiOCl, SbOCl, $Bi(NO_3)_3$, $Cu(NO_3)_2$, $NaNO_3$, and $NO_3NH_4$;
the component C is a low-melting-point compound with a melting point $\leq 820°$ C.; and
the component D is CaO or $Ca(OH)_2$.

In the preparation method of glassless grain-oriented silicon steel as disclosed according to some embodiments of the disclosure, in the mixture containing MgO and $Al_2O_3$, a mass fraction of the $Al_2O_3$ is $\leq 60\%$, and a volume percentage of particles with a particle size $\geq 10$ μm is between 30~60%.

In the preparation method of glassless grain-oriented silicon steel as disclosed according to some embodiments of the disclosure, in the mixture containing MgO and $Al_2O_3$, a mass ratio of the MgO and the $Al_2O_3$ is 90:5.

In the preparation method of glassless grain-oriented silicon steel as disclosed according to some embodiments of the disclosure, an activity of the MgO as measured by citric acid is between 200-2000 S; and
a specific surface area of the $Al_2O_3$ is between 15~50 m²/g.

In the preparation method of glassless grain-oriented silicon steel as disclosed according to some embodiments of the disclosure, the low-melting-point compound with the melting point $\leq 820°$ C. is one or more selected from a group consisting of boron oxide, sodium carbonate, borax, and antimony oxide.

In the preparation method of glassless grain-oriented silicon steel as disclosed according to some embodiments of the disclosure, the low-melting-point compound with the melting point $\leq 820°$ C. is boron oxide or antimony oxide.

In the preparation method of glassless grain-oriented silicon steel as disclosed according to some embodiments of the disclosure, in the separator, a mass ratio of the component A, the component B, the component C, and the component D is 100:(0.5~6): (0.6~3):(0.6-5.3).

In the preparation method of glassless grain-oriented silicon steel as disclosed according to some embodiments of the disclosure, the separator further comprises $NH_4Cl$, and the $NH_4Cl$ is metered by a mass fraction; and in the separator, the mass ratio of the component A and the $NH_4Cl$ is 100:(1~2.1).

In the preparation method of glassless grain-oriented silicon steel as disclosed according to some embodiments of the disclosure, the separator comprises the component A, the component B, the component C, the component D, and $NH_4Cl$; and in the separator, the mass ratio of the component A, the component B, the component C, the component D, and the $NH_4Cl$ is 100:3:2:5:1.9.

In the preparation method of glassless grain-oriented silicon steel as disclosed according to some embodiments of the disclosure, the component A is a mixture containing MgO and $Al_2O_3$;

the component B is $MgCl_2$;

the component C is antimony oxide; and the component D is $Ca(OH)_2$.

In the preparation method of glassless grain-oriented silicon steel as disclosed according to some embodiments of the disclosure, during the hot stretch flattening, a four-step washing process is used and comprises sequentially:

washing with water;

acid-washing with a mixed solution containing sulfuric acid with a mass concentration of 1%~10% and nitric acid with a mass concentration of 1%~5%; wherein a temperature of the acid-washing is between 50~80° C.;

washing with a mixture containing water and a complexing agent for Fe ions; wherein in the mixture, the mass concentration of the complexing agent for Fe ions is 0.5~5%; and washing with water.

In the preparation method of glassless grain-oriented silicon steel as disclosed according to some embodiments of the disclosure, during the decarburization annealing, a dew point is between 38~58° C.; and a heating temperature is between 800~850° C.

In the preparation method of glassless grain-oriented silicon steel as disclosed according to some embodiments of the disclosure, the complexing agent for Fe ions may be ammonium citrate. In this technical solution, the ammonium citrate may further prevent the residual Fe ions on surface of the strip from being oxidized, thereby obtaining a good surface.

In the preparation method of glassless grain-oriented silicon steel as disclosed according to some embodiments of the disclosure, the casting slab includes, by a mass percentage, C 0.05~0.09%, Si 2.9~4.6%, Mn 0.05~0.20%, S 0.005~0.020%, Als 0.0225~0.0325%, N 0.0045~0.0145%, Sn 0.01~0.30%, Sb 0.002~0.15%, Cr 0.01~0.5%, and Cu 0.01~0.8%, and the rest are Fe and inevitable impurity elements.

In the preparation method of glassless grain-oriented silicon steel as disclosed according to some embodiments of the disclosure, the casting slab includes, by a mass percentage, C 0.06~0.07%, Si 3.2~3.5%, Mn 0.16~0.17%, S 0.015~0.019%, Als 0.028~0.030%, N 0.012~0.013%, Sn 0.10~0.20%, Sb 0.09~0.11%, Cr 0.3~0.4%, and Cu 0.1~0.3%, and the rest are Fe and inevitable impurity elements.

In another aspect of the disclosure, glassless grain-oriented silicon steel obtained through the preparation method of glassless grain-oriented silicon steel as described in the disclosure is also provided.

The glassless grain-oriented silicon steel obtained through the preparation method of glassless grain-oriented silicon steel as disclosed according to some embodiments of the disclosure has a thickness of 0.18 mm, 0.20 mm, 0.23 mm, 0.27 mm, 0.30 mm, or 0.35 mm.

One or more technical embodiments described in the disclosure have at least the following technical effects or advantages:

(1) In the preparation method of glassless grain-oriented silicon steel provided herein, by controlling the thickness of the oxide film formed on strip in the decarburization annealing stage as well as the cooling stage process during the high-temperature annealing, glassless grain-oriented silicon steel with good surface finishing, good surface homogenization, high yield and excellent magnetic properties can be obtained.

(2) In the preparation method of glassless grain-oriented silicon steel provided herein, for the purpose of the disclosure, specific components contained in the separator and their respective contents are selected and matched with a series of specific process parameters through a lot of optimization and balance testing, such that the obtained glassless grain-oriented silicon steel has a surface that is uniformly formed, bright and clean without oxide residue, and has no obvious vapor marks and with a small friction coefficient.

(3) In the preparation method of glassless grain-oriented silicon steel provided herein, by controlling the thickness of the oxide film formed on strip in the decarburization annealing stage as well as the cooling stage process during the high-temperature annealing, optimizing the hot stretch flattening process, and developing the four-step washing process, the defects of the glassless grain-oriented silicon steel, such as poor surface uniformity, poor finishing, low yield, and deterioration of magnetic properties, can be better solved, thereby obtaining the glassless grain-oriented silicon steel with a uniform surface, excellent finishing, good magnetic properties, and a pass rate of 90% or more.

DETAILED DESCRIPTION

The disclosure will be described in detail below with reference to specific embodiments and examples, and the advantages and various effects of the disclosure will be more clearly presented thereby. It should be understood by those skilled in the art that these specific embodiments and examples are used to illustrate, rather than limit, the disclosure.

Throughout the description, unless otherwise specified, the terms as used herein should be understood as having the meaning that is commonly used in the art. Therefore, unless otherwise defined, all technical and scientific terms as used herein have the same meaning as commonly understood by one of ordinary skill in the art to which the disclosure belongs. In case of conflict, the specification takes precedence.

Unless otherwise specified, various raw materials, reagents, instruments and equipment etc. used in the disclosure are either commercially available or can be prepared by existing methods.

At present, glassless grain-oriented silicon steel is an important direction in the development of oriented silicon steel, and it has both the excellent magnetic permeability of grain-oriented silicon steel and the good processability of non-oriented silicon steel, and thus has broad application prospects in the manufacture of high-energy-efficiency motors and generators. In addition, surface finishing of the glassless grain-oriented silicon steel can further improve the magnetic performance of grain-oriented silicon steel.

However, currently the glassless grain-oriented silicon steel has the following major problems: (1) the surface finishing of the glassless grain-oriented silicon steel is difficult; (2) the glassless grain-oriented silicon steel tends to have the defect of unstable magnetic property; (3) in the manufacturing process of the glassless grain-oriented silicon steel, homogenization of the surface and magnetic properties of the strip can hardly be achieved due to the differences in temperature and atmosphere during production of large steel coils. These defects lead to the low yield of the glassless grain-oriented silicon steel.

Therefore, there is an urgent need to develop a preparation method of glassless grain-oriented silicon steel, so as to solve the problems of surface finishing and homogenization of the glassless grain-oriented silicon steel.

In order to solve the above-mentioned technical problems, the technical solutions provided by some embodiments of the disclosure have a general idea as below.

In one aspect of the disclosure, a preparation method of glassless grain-oriented silicon steel is provided. The preparation method may include: processes of steelmaking, continuous casting, casting slab heating, hot rolling, normalizing, cold rolling, decarburization annealing, nitriding, separator coating, high-temperature annealing, and hot stretch flattening and coating; wherein:
during the decarburization annealing, a thickness of an oxide film formed on surface of strip is between 1.5~2.5 μm; and an atomic weight ratio of Si element and Fe element in the oxide film satisfies: Si/(Si+Fe)≥0.76; and
during the high-temperature annealing, a cooling stage may comprise sequentially:
cooling with an inner cover when a temperature drops from 1200° C. to 500° C.;
wherein a protective gas may be a mixed gas containing nitrogen and hydrogen, and a volume percentage of the hydrogen in the mixed gas is >3%;
cooling with the inner cover when the temperature drops from 500° C. to 200° C.; wherein the protective gas may be nitrogen; and
cooling in air by removing the inner cover when the temperature is <200° C.

In the preparation method of glassless grain-oriented silicon steel according to some embodiments of the disclosure, by controlling the thickness of the oxide film formed on strip in decarburization annealing stage, a dense oxide film with low activity is obtained to prevent the formation of magnesia-alumina spinel, as well as to prevent iron elements that are reduced from a large amount of iron oxides in the oxide film from attaching to the surface of the strip, which results in a rough surface of a final product. Moreover, by further controlling process parameters in the cooling stage of high-temperature annealing of the strip, glassless grain-oriented silicon steel with good surface finishing, good surface homogenization, high yield and excellent magnetic properties is obtained.

In the preparation method of glassless grain-oriented silicon steel as disclosed according to some embodiments of the disclosure, during casting slab heating, a heating temperature may be 1150° C.

In the preparation method of glassless grain-oriented silicon steel according to some embodiments of the disclosure, the inventors conducted a lot of research on the temperature of the casting slab heating, and finally selected the most suitable heating temperature to be 1150° C., such that the obtained glassless grain-oriented silicon steel had a higher yield.

In the preparation method of glassless grain-oriented silicon steel as disclosed according to some embodiments of the disclosure, the thickness of the oxide film formed on surface of the strip is between 1.5~2.5 μm, including that:
the thickness of the oxide film formed on surface of the strip is 1.9~2.3 μm.

In the preparation method of glassless grain-oriented silicon steel according to some embodiments of the disclosure, the inventors conducted a lot of research on the thickness of the oxide film formed on surface of the strip and got the preferred embodiments of the thickness of the oxide film being 1.9~2.3 μm, such that the surface quality of the final product was greatly improved.

In the preparation method of glassless grain-oriented silicon steel as disclosed according to some embodiments of the disclosure, during the separator coating, a separator may include: a component A, a component B, a component C, and a component D;
wherein the component A may be MgO, or the component A may be a mixture containing MgO and $Al_2O_3$;
the component B may be one or more selected from a group consisting of NaCl, KCl, $MgCl_2$, $ZnCl_2$, $BaCl_2$, $SrCl_2$, $MnCl_2$, $CaCl_2$, BiOCl, SbOCl, $Bi(NO_3)_2$, $Cu(NO_3)_2$, $NaNO_3$, and $NO_3NH_4$;
the component C may be a low-melting-point compound with a melting point ≥820° C.; and
the component D may be CaO or $Ca(OH)_2$.

In the preparation method of glassless grain-oriented silicon steel according to some embodiments of the disclosure, specific components contained in the separator and their respective contents were selected and matched with a series of process parameters by the inventors through a lot of optimization and balance testing, such that the obtained glassless grain-oriented silicon steel had a surface that is uniformly formed, bright and low in oxide residue, and has no obvious vapor marks and with a small friction coefficient.

In the preparation method of glassless grain-oriented silicon steel as disclosed according to some embodiments of the disclosure, in the mixture containing MgO and $Al_2O_3$, a mass ratio of the MgO and the $Al_2O_3$ may be 90:5.

In the preparation method of glassless grain-oriented silicon steel according to some embodiments of the disclosure, the mass ratio of MgO and $Al_2O_3$ in the mixture containing MgO and $Al_2O_3$ was selected to be 90:5 by the inventors through a lot of optimization and balance testing, which further improved the surface finishing and uniformity of the strip.

In the preparation method of glassless grain-oriented silicon steel as disclosed according to some embodiments of the disclosure, an activity of the MgO as measured by citric acid may be between 200~2000 S;
in the separator, a volume percentage of particles with a particle size ≥10 μm is between 30~60%; and
a specific surface area of the $Al_2O_3$ is between 15~50 $m^2/g$.

Through a large amount of research, the inventors found that on the basis of realizing the purpose of the disclosure, the above-mentioned technical solution may further control the reactivity of MgO more effectively and may avoid that the surface of the strip has poor uniformity due to MgO reacting too fast with the oxide film. In addition, by adding CaO or $Ca(OH)_2$, the slurry adhesion of the separator is improved, thereby more effectively avoiding the defect of uneven surface quality caused by uneven coating. In some embodiments, the disclosure also defines the particle size of particles in the separator to reduce the hydration rate, while improving the air permeability between layers for high temperature annealing, so as to better avoid the defect of vapor marks on surface of the strip due to uneven vapor release.

In the preparation method of glassless grain-oriented silicon steel as disclosed according to some embodiments of the disclosure, the low-melting-point compound with the melting point ≤820° C. may be one or more selected from a group consisting of boron oxide, sodium carbonate, borax, and antimony oxide.

In the preparation method of glassless grain-oriented silicon steel as disclosed according to some embodiments of the disclosure, the low-melting-point compound with the melting point ≤820° C. may be boron oxide or antimony oxide.

The inventors found that during the high temperature annealing, the reaction between MgO and the oxide film (i.e., $SiO_2$) for generating a $Mg_2SiO_4$ glass film belongs to a solid phase reaction, while the low-melting-point compound with the melting point ≤820° C. may produce a liquid phase in high temperature annealing, which may facilitate mass transfer process and accelerate the formation rate of the glass film and increase looseness of the glass film, such that the glass film may be easier to be removed in a subsequent process. Meanwhile, the low-melting-point compound with the melting point ≤820° C. may help improve the surface uniformity of the strip, and may have a certain control effect on the decomposition of the inhibitor on surface of the strip, thereby help stabilize the magnetic properties of the strip.

In the preparation method of glassless grain-oriented silicon steel as disclosed according to some embodiments of the disclosure, in the separator, a mass ratio of the component A, the component B, the component C, and the component D may be 100:(0.5~6): (0.6~3):(0.6~5.3).

In the preparation method of glassless grain-oriented silicon steel according to some embodiments of the disclosure, the inventors optimized specific components contained in the separator and their respective contents, which greatly promoted the surface finishing of the glassless grain-oriented silicon steel and the homogenization of the magnetic properties of the glassless grain-oriented silicon steel and made the magnetic properties of the glassless grain-oriented silicon steel more stable.

In the preparation method of glassless grain-oriented silicon steel as disclosed according to some embodiments of the disclosure, the separator may further comprise $NH_4Cl$, and the $NH_4Cl$ is metered by the mass fraction; and
in the separator, a mass ratio of the component A and the $NH_4Cl$ may be 100:(1~2.1).

The inventors found through a lot of research that the $NH_3$ gas released from the decomposition of $NH_4Cl$ under high temperature may inhibit decomposition of $Si_3N_4$ nitrided in the surface of the strip to a certain extent, thereby enhancing the effect of preventing the magnetic properties of the strip from being unstable due to the rapid decomposition of the inhibitor.

In the preparation method of glassless grain-oriented silicon steel as disclosed according to some embodiments of the disclosure, the separator may include the component A, the component B, the component C, the component D, and $NH_4Cl$; and
in the separator, a mass ratio of the component A, the component B, the component C, the component D, and $NH_4Cl$ may be 100:3:2:5:1.9.

The inventors further optimized the content ratio of specific components in the separator, which significantly improved the yield of the glassless grain-oriented silicon steel, and also greatly promoted surface finishing, surface homogeneity, and magnetic properties.

In the preparation method of glassless grain-oriented silicon steel as disclosed according to some embodiments of the disclosure, the component A may be a mixture containing MgO and $Al_2O_3$;
the component B may be $MgCl_2$;
the component C may be antimony oxide; and
the component D may be $Ca(OH)_2$.

The disclosure is more conducive to realizing the technical effect of the disclosure by selecting specific components in the separator, and the final product is uniform and bright, with an oxide residue ≤0.03 $g/m^2$, no obvious vapor marks, and a friction coefficient <0.25.

In the preparation method of glassless grain-oriented silicon steel as disclosed according to some embodiments of the disclosure, during the hot stretch flattening and coating, a four-step washing process is used and may include sequentially:
washing with water;
acid-washing with a mixed solution containing sulfuric acid with a mass concentration of 1%~10% and nitric acid with a mass concentration of 1%~5%; wherein a temperature of the acid-washing is between 50~80° C.;
washing with a mixture containing water and a complexing agent for Fe ions; wherein in the mixture, a mass concentration of the complexing agent for Fe ions is between 0.5~5%; and
washing with water.

In the preparation method of glassless grain-oriented silicon steel according to some embodiments of the disclosure, during the hot stretch flattening and coating, the four-step washing process is used, in which by adding a certain amount of nitric acid, the residual iron and iron oxides in the cooling stage of the high temperature annealing are removed, and meanwhile the roughness of the surface of the strip is further reduced, which is more conducive to obtaining a smooth surface. In addition, in the washing process, the mixture containing water and the complexing agent for Fe ion is used for washing, which is more conducive to removing residual iron ions on surface of the strip after acid-washing, and avoids the defect of a yellowing phenomenon on surface of the strip caused by the secondary oxidation of the residual iron ions on surface of the strip after the cleaning stage.

In the preparation method of glassless grain-oriented silicon steel as disclosed according to some embodiments of the disclosure, during the decarburization annealing, a dew point is between 38~58° C.; and a heating temperature is between 800~850° C.

In the disclosure, in order to better achieve the purpose of the disclosure, the dew point and heating temperature during the decarburization annealing are controlled, which can ensure not only the decarburization effect, but also the target thickness of the oxide film described in the disclosure, and may be used to obtain a denser $SiO_2$ layer on the surface, such that the uniformity of the reaction rate of forsterite film formation during the high temperature annealing can be controlled.

In the preparation method of glassless grain-oriented silicon steel as disclosed according to some embodiments of the disclosure, the casting slab may include, metered by a mass percentage, C 0.05~0.09%, Si 2.9~4.6%, Mn 0.05~0.20%, S 0.005~0.020%, Als 0.0225~0.0325%, N 0.0045~0.0145%, Sn 0.01~0.30%, Sb 0.002~0.15%, Cr 0.01~0.5%, and Cu 0.01~0.8%, and the rest may be Fe and inevitable impurity elements.

In the preparation method of glassless grain-oriented silicon steel as disclosed according to some embodiments of the disclosure, the casting slab may include, metered by a mass percentage, C 0.06~0.07%, Si 3.2~3.5%, Mn 0.16~0.17%, S 0.015~0.019%, Als 0.028~0.030%, N 0.012~0.013%, Sn 0.10~0.20%, Sb 0.09~0.11%, Cr 0.3~0.4%, and Cu 0.1~0.3%, and the rest may be Fe and inevitable impurity elements.

In order to better realize the technical effect of the disclosure, the inventors selected and optimized the chemical elements contained in the casting slab and their respective contents, such that glassless grain-oriented silicon steel with better surface uniformity, better finishing, lower friction coefficient, higher pass rate, and better magnetic properties was obtained.

The preparation method of glassless grain-oriented silicon steel of the disclosure will be described in detail below with reference to the embodiments, comparative example and experimental data.

Embodiments

This embodiment includes 8 test groups. In the test groups 1-8, the preparation method for glassless grain-oriented silicon steel according to some embodiments of the disclosure was used, which may include processes of steelmaking, continuous casting, casting slab heating, hot rolling, normalizing, cold rolling, decarburization annealing, nitriding, separator coating, high-temperature annealing, and hot stretch flattening and coating.

In some embodiments, the casting slab obtained through the steelmaking and the continuous casting is hot-rolled into a hot-rolled sheet after heat preservation, then the hot-rolled sheet is normalized and is further cold-rolled into a cold-rolled sheet by a 20-Hi Cold Rolling Mill; the cold-rolled sheet is subjected to decarburization annealing, nitriding, and separator coating, and after drying, subjected to high-temperature annealing, and hot stretch flattening and coating, to form a finished product. In some embodiments:

in the casting slab heating stage: the heating temperature may be 1150° C.;
in the decarburization annealing stage: a thickness of an oxide film formed on surface of strip is between 1.5~2.5 µm; an atomic weight ratio of Si element and Fe element in the oxide film satisfies: Si/(Si+Fe)≥0.76; during the decarburization annealing, a dew point is between 38~58° C.; and the heating temperature is between 800~850° C.; and
in the separator coating stage, the separator may include: a component A, a component B, a component C, a component D, and NH$_4$Cl.

In some embodiments, the component A may be MgO, or the component A is a mixture containing MgO and Al$_2$O$_3$; in the mixture containing MgO and Al$_2$O$_3$, a mass fraction of the Al$_2$O$_3$ is ≤60%, and a volume percentage of particles with a particle size ≥10 µm is between 30~60%; an activity of the MgO as measured by citric acid is between 200~2000 S; and a specific surface area of the Al$_2$O$_3$ is between 15~50 m$^2$/g;

the component B may be one or more selected from a group consisting of NaCl, KCl, MgCl$_2$, ZnCl$_2$, BaCl$_2$, SrCl$_2$, MnCl$_2$, CaCl$_2$, BiOCl, SbOCl, Bi(NO$_3$)$_3$, Cu(NO$_3$)$_2$, NaNO$_3$, and NO$_3$NH$_4$;

the component C may be a low-melting-point compound with a melting point ≤820° C., and the low-melting-point compound with the melting point ≤820° C. may be one or more selected from a group consisting of boron oxide, sodium carbonate, borax, and antimony oxide; and the component D may be CaO or Ca(OH)$_2$;

in the separator, a mass ratio of the component A, the component B, the component C, and the component D may be 100:(0.5~6):(0.6~3):(0.6~5.3);

the separator may further include NH$_4$Cl, and a mass ratio of the component A and the NH$_4$Cl may be 100:(1-2.1).

The high-temperature annealing stage:

the cooling stage may include sequentially:

(1) cooling with an inner cover when a temperature ranges from 1200° C. to 500° C.; wherein a protective gas may be a mixed gas containing nitrogen and hydrogen, and a volume percentage of the hydrogen in the mixed gas is >3%;

(2) cooling with the inner cover when the temperature ranges from 500° C. to 200° C.; wherein the protective gas is nitrogen; and (3) cooling in air by removing the inner cover when the temperature is <200° C.

The hot stretch flattening and coating stage:

a four-step washing process is used and may include sequentially:

(1) washing with water;

(2) acid-washing with a mixed solution containing sulfuric acid with a mass concentration of 1%~10% and nitric acid with a mass concentration of 1%~5%; wherein a temperature of the acid-washing is between 50~80° C.;

(3) washing with a mixture containing water and ammonium citrate; wherein in the mixture, a mass concentration of the ammonium citrate is between 0.5~5%; and (4) washing with water.

In some embodiments, the casting slab may include, metered by a mass percentage, C 0.05~0.09%, Si 2.9~4.6%, Mn 0.05~0.20%, S 0.005~0.020%, Als 0.0225~0.0325%, N 0.0045~0.0145%, Sn 0.01~0.30%, Sb 0.002~0.15%, Cr 0.01~0.5%, and Cu 0.01~0.8%, and the rest may be Fe and inevitable impurity elements.

The specific process parameters of the 8 test groups in this embodiment are as shown in Table 1 and Table 2:

TABLE 1

Process parameters according to same embodiments of the disclosure

| No. | Heating temperature of casting slab (° C.) | Thickness of oxide film (µm) | Dew point of decarburization annealing (° C.) | Heating temperature of decarburization annealing (° C.) |
|---|---|---|---|---|
| Test Group 1 | 1150 | 1.5 | 38 | 800 |
| Test Group 2 | 1150 | 2.4 | 39 | 850 |
| Test Group 3 | 1150 | 2.5 | 40 | 845 |
| Test Group 4 | 1150 | 2.0 | 48 | 830 |
| Test Group 5 | 1150 | 1.9 | 58 | 830 |
| Test Group 6 | 1150 | 2.2 | 50 | 830 |
| Test Group 7 | 1150 | 2.3 | 45 | 840 |
| Test Group 8 | 1150 | 2.3 | 44 | 830 |

TABLE 2

Components contained in the separator and their respective mass fractions according to same embodiments of the disclosure

| Separator | Component A | Component B | Component C | Component D | NH₄Cl |
|---|---|---|---|---|---|
| Test Group 1 | MgO: 45 parts Al₂O₃: 55 parts | CaCl₂: 3 parts Bi(NO₃)₂: 0.8 parts | Boron Oxide: 0.8 parts | CaO: 2 parts | none |
| Test Group 2 | MgO: 85 parts Al₂O₃: 15 parts | SrCl₂: 3 parts SbOCl: 0.4 parts | Sodium Carbonate: 0.6 parts | Ca (OH)₂: 2 parts | none |
| Test Group 3 | MgO: 100 parts | KCl: 3 parts | Borax: 2 parts | CaO: 0.6 parts | NH₄Cl: 1 part |
| Test Group 4 | MgO: 94.7 parts Al₂O₃: 5.3 parts | MgCl₂: 3 parts | Antimony Oxide: 2 parts | Ca (OH)₂: 5 parts | NH₄Cl: 1.9 parts |
| Test Group 5 | MgO: 77 parts Al₂O₃: 23 parts | MnCl₂: 1 parts Cu(NO₃)₂: 2 parts | Antimony Oxide: 0.6 parts | CaO: 3 parts | NH₄Cl: 2.1 parts |
| Test Group 6 | MgO: 95 parts Al₂O₃: 5 parts | ZnCl₂: 3 parts NO₃NH₄: 3 parts | Boron Oxide: 3 parts | Ca (OH)₂: 5.3 parts | NH₄Cl: 2 parts |
| Test Group 7 | MgO: 80 parts Al₂O₃: 20 parts | NaCl: 6 parts | Borax: 2 parts | Ca (OH)₂: 5 parts | NH₄Cl: 2 parts |
| Test Group 8 | MgO: 40 parts Al₂O₃: 60 parts | NaNO₃: 2 parts | Antimony Oxide: 2 parts | Ca (OH)₂: 4 parts | NH₄Cl: 1.5 parts |

Wherein chemical components contained in the casting slab are shown in Table 3 by mass percentage;

TABLE 3 chemical components in the casting slab according to same embodiments of the disclosure

| No. | C(%) | Si(%) | Mn(%) | S(%) | Als(%) | N(%) | Sn(%) | Sb(%) | Cr(%) | Cu(%) |
|---|---|---|---|---|---|---|---|---|---|---|
| Test Group 1 | 0.05 | 2.9 | 0.05 | 0.005 | 0.0225 | 0.0045 | 0.01 | 0.002 | 0.01 | 0.01 |
| Test Group 2 | 0.09 | 4.6 | 0.2 | 0.02 | 0.0325 | 0.0145 | 0.3 | 0.15 | 0.5 | 0.8 |
| Test Group 3 | 0.06 | 3.2 | 0.16 | 0.015 | 0.028 | 0.012 | 0.10 | 0.09 | 0.3 | 0.1 |
| Test Group 4 | 0.08 | 4.1 | 0.17 | 0.019 | 0.030 | 0.013 | 0.29 | 0.11 | 0.4 | 0.6 |
| Test Group 5 | 0.05 | 3.0 | 0.12 | 0.005 | 0.0027 | 0.0050 | 0.20 | 0.005 | 0.08 | 0.04 |
| Test Group 6 | 0.09 | 3.5 | 0.2 | 0.009 | 0.0325 | 0.012 | 0.25 | 0.009 | 0.2 | 0.3 |
| Test Group 7 | 0.08 | 4.0 | 0.1 | 0.01 | 0.028 | 0.013 | 0.26 | 0.10 | 0.24 | 0.09 |
| Test Group 8 | 0.07 | 4.6 | 0.16 | 0.019 | 0.030 | 0.0145 | 0.29 | 0.15 | 0.45 | 0.6 |

Comparative Example

This comparative example includes 8 comparative groups. In the comparative groups 1-8, oriented silicon steel was prepared with the relevant steps in the 8 test groups of the embodiments of the disclosure, and the differences were: the thickness of the oxide film was different, the separator used was different, and whether the hot stretching flattening and the cooling stage process in high temperature annealing are respectively used was different.

TABLE 4

Process parameters provided in the comparative groups

| No. | Thickness of oxide film (μm) | Whether the four-step washing process in the hot stretching flattening provided by the disclosure is used | Whether the cooling stage process in high temperature annealing provided by the disclosure is used |
|---|---|---|---|
| Comparative Group 1 | 1.5 | No | Yes |
| Comparative Group 2 | 2.4 | Yes | No |
| Comparative Group 3 | 2.5 | No | No |
| Comparative Group 4 | 1.2 | Yes | No |
| Comparative Group 5 | 1.4 | Yes | Yes |
| Comparative Group 6 | 2.9 | Yes | No |

TABLE 4-continued

Process parameters provided in the comparative groups

| No. | Thickness of oxide film (μm) | Whether the four-step washing process in the hot stretching flattening provided by the disclosure is used | Whether the cooling stage process in high temperature annealing provided by the disclosure is used |
|---|---|---|---|
| Comparative Group 7 | 2.6 | Yes | Yes |
| Comparative Group 8 | 3.0 | No | Yes |

TABLE 5

Components contained in the separator and their respective mass parts provided in the comparative groups

| Separator | Component 1 | Component 2 | Component 3 | Component 4 |
|---|---|---|---|---|
| Comparative Group 1 | MgO: 45 parts Al$_2$O$_3$: 55 parts | CaCl$_2$: 0.2 parts Bi(NO$_3$)$_2$: 0.1 parts | Boron Oxide: 0.8 parts | NH$_4$Cl: 0.8 parts |
| Comparative Group 2 | MgO: 85 parts Al$_2$O$_3$: 15 parts | SrCh: 3 parts SbOCl: 0.4 parts | Sodium Carbonate: 4 parts | none |
| Comparative Group 3 | MgO: 100 parts | KCl: 7 parts | Bborax: 0.5 parts | NH$_4$Cl: 1 part |
| Comparative Group 4 | MgO: 94 parts Al$_2$O$_3$: 5 parts | MgCh: 3 parts | Antimony Oxide: 2 parts | none |
| Comparative Group 5 | MgO: 30 parts Al$_2$O$_3$: 70 parts | MnCl$_2$: 1 parts Cu(NO$_3$)$_2$: 2 parts | Antimony Oxide: 0.6 parts | none |
| Comparative Group 6 | MgO: 35 parts Al$_2$O$_3$: 65 parts | ZnCh: 3 parts NO$_3$NH$_4$: 3 parts | Boron Oxide: 3.5 parts | NH$_4$Cl: 2 parts |
| Comparative Group 7 | MgO: 30 parts Al$_2$O$_3$: 70 parts | NaCl: 6 parts | Borax: 2 parts | none |
| Comparative Group 8 | MgO: 40 parts Al$_2$O$_3$: 67 parts | NaNO$_3$: 2 parts | Antimony Oxide: 2 parts | NH$_4$Cl: 1.5 parts |

The performance of the oriented silicon steel prepared through the above Embodiments and the Comparative Examples were tested separately, and the comparative results are shown in Table 6:

TABLE 6

Performance tested on the oriented silicon steel prepared through the above Embodiments and the Comparative Examples

| No. | Surface comprehensive evaluation | Surface roughness Ra (μm) | Surface pass rate (%) | Magnetic Induction B800(T) | Iron loss without insulating coating (P1.7/50, W/kg) |
|---|---|---|---|---|---|
| Test Group 1 | Grade 2 | 0.34 | 92 | 1.926 | 1.06 |
| Test Group 2 | Grade 3 | 0.32 | 93 | 1.930 | 1.08 |
| Test Group 3 | Grade 2 | 0.32 | 93.5 | 1.935 | 1.08 |
| Test Group 4 | Grade 1 | 0.28 | 95 | 1.944 | 1.02 |
| Test Group 5 | Grade 1 | 0.28 | 94.2 | 1.936 | 1.03 |
| Test Group 6 | Grade 1 | 0.29 | 95 | 1.939 | 1.03 |
| Test Group 7 | Grade 1 | 0.28 | 94.5 | 1.938 | 1.05 |
| Test Group 8 | Grade 1 | 0.28 | 94.5 | 1.936 | 1.04 |
| Comparative Group 1 | Grade 3 | 0.52 | 90.5 | 1.911 | 1.15 |
| Comparative Group 2 | Grade 4 | 0.48 | 87 | 1.914 | 1.18 |
| Comparative Group 3 | Grade 4 | 0.56 | 68 | 1.892 | 1.21 |
| Comparative Group 4 | Grade 4 | 0.49 | 52 | 1.885 | 1.23 |

TABLE 6-continued

Performance tested on the oriented silicon steel prepared through the above Embodiments and the Comparative Examples

| No. | Surface comprehensive evaluation | Surface roughness Ra (μm) | Surface pass rate (%) | Magnetic Induction B800(T) | Iron loss without insulating coating (P1.7/50, W/kg) |
|---|---|---|---|---|---|
| Comparative Group 5 | Grade 3 | 0.52 | 88 | 1.911 | 1.15 |
| Comparative Group 6 | Grade 4 | 0.48 | 87 | 1.892 | 1.18 |
| Comparative Group 7 | Grade 4 | 0.56 | 52 | 1.914 | 1.21 |
| Comparative Group 8 | Grade 3 | 0.49 | 67 | 1.885 | 1.23 |

Notes:
Grade 1: uniform, bright, excellent, with an oxide residue ≤ 0.03 g/m², no obvious vapor marks, and a friction coefficient < 0.25;
Grade 2: uniform, bright, good, with an oxide residue ≤ 0.05 g/m², slight vapor marks on edges, and a friction coefficient < 0.35;
Grade 3: less uniform, dull, with an oxide residue ≤ 0.07 g/m², partial vapor marks, and a friction coefficient > 0.45; and
Grade 4: extremely uneven, dull, with an oxide residue > 0.1 g/m², obvious vapor marks, and a friction coefficient > 0.5.

As can be seen from the comparison between the above Embodiments and the Comparative Examples of the disclosure: in the preparation method of glassless grain-oriented silicon steel according to some embodiments of the disclosure, by controlling the thickness of the oxide film, using a specific separator, using specific hot stretch flattening process and cooling stage process in high-temperature annealing, the defects, such as poor uniformity, poor finish, low yield, and deterioration of magnetic properties on surface of glassless grain-oriented silicon steel can be solved, thereby obtaining the glassless grain-oriented silicon steel with a uniform surface, excellent finish, good magnetic properties, low oxide residue, no obvious vapor marks, small friction coefficient, and a pass rate of 90% or more, as shown in Table 6.

Finally, it should also be noted that the terms "comprising", "including" or any other variant thereof are intended to be non-exclusive, such that a process, method, article or device that includes a series of elements includes not only those elements, but also other elements not expressly listed or elements inherent to such process, method, article or device.

Although the preferred embodiments of the disclosure have been described, further changes and modifications to these embodiments may occur to those skilled in the art once the basic inventive concept is known. Therefore, the appended claims are intended to be construed to include the preferred embodiments and all the changes and modifications that fall within the scope of the disclosure.

Obviously, those skilled in the art can make various modifications and variations to the disclosure without departing from the spirit and scope of the disclosure. Thus, provided that these modifications and variations to the disclosure fall within the scope of the claims of the disclosure and their equivalents, the disclosure is also intended to cover such modifications and variations.

The invention claimed is:

1. A preparation method of glassless grain-oriented silicon steel, comprising processes of steelmaking and continuous casting to obtain a casting slab, casting slab heating, hot rolling, normalizing, cold rolling, decarburization annealing, nitriding, separator coating, annealing, and hot stretch flattening and coating;

wherein:
during the decarburization annealing, a dew point is between 38-58° C. and a heating temperature is between 800-850° C. wherein a thickness of an oxide film formed on a surface of strip is between 1.5-2.5 μm; and an atomic weight ratio of Si element and Fe element in the oxide film satisfies: $Si/(Si+Fe) \geq 0.76$;

during the separator coating, a separator comprises: a component A, a component B, a component C, and a component D; wherein: the component A is MgO, or a mixture containing MgO and $Al_2O_3$; the component B is one or more selected from a group consisting of NaCl, KCl, $MgCl_2$, $ZnCl_2$, $BaCl_2$, $SrCl_2$, $MnCl_2$, $CaCl_2$, BiONcoCl, SbOCl, $Bi(NO_3)_2$, $Cu(NO_3)_2$, $NaNO_3$, and $NO_3NH_4$; the component C is a low-melting-point compound with a melting point ≤820° C.; and the component D is CaO or $Ca(OH)_2$; wherein in the separator, a mass ratio of the component A, the component B, the component C, and the component D is 100:(0.5-6):(0.6-3):(0.6-5.3);

during the annealing, a cooling stage comprises sequentially: a) cooling from a temperature of 1200° C. to 500° C. with an inner cover, wherein a protective gas is a mixed gas containing nitrogen and hydrogen, and a volume percentage of the hydrogen in the mixed gas is >3%; b) cooling from a temperature of 500° C. to 200° C. with the inner cover, wherein the protective gas is nitrogen; and c) cooling in air by removing the inner cover when temperature is <200° C.;

during the hot stretch flattening and coating, a four-step washing process is used, and the four-step washing process comprises sequentially: a) washing with water; b) acid-washing with a mixed solution containing sulfuric acid with a mass concentration of 1%-10% and nitric acid with a mass concentration of 1%-5%; wherein a temperature of the acid-washing is between 50-80° C.; c) washing with a mixture containing water and a complexing agent for Fe ions, wherein in the mixture, a mass concentration of the complexing agent for Fe ions is between 0.5-5%; and d) washing with water;

wherein the casting slab comprises, in mass percentage, C: 0.05-0.09%, Si: 2.9-4.6%, Mn: 0.05-0.20%, S: 0.005-0.020%, Als: 0.0225-0.0325%, N: 0.0045-0.0145%, Sn: 0.01-0.30%, Sb: 0.002-0.15%, Cr: 0.01-

0.5%, and Cu: 0.01-0.8%, and remainder: Fe and inevitable impurity elements.

2. The preparation method of glassless grain-oriented silicon steel according to claim 1, wherein the component A is the mixture containing MgO and $Al_2O_3$; and in the mixture containing MgO and $Al_2O_3$, a mass fraction of the $Al_2O_3$ is ≤60%, and a volume percentage of particles with a particle size ≥10 μm is between 30-60%.

3. The preparation method of glassless grain-oriented silicon steel according to claim 1, wherein an activity of the MgO as measured by citric acid is between 200-2000 S; and a specific surface area of the $Al_2O_3$ is between 15-50 $m^2/g$.

4. The preparation method of glassless grain-oriented silicon steel according to claim 1, wherein the low-melting-point compound with the melting point ≤820° C. is one or more selected from a group consisting of boron oxide, sodium carbonate, borax, and antimony oxide.

5. The preparation method of glassless grain-oriented silicon steel according to claim 4, wherein the separator further comprises $NH_4Cl$, wherein a mass ratio of the component A and the $NH_4Cl$ is 100:(1-2.1).

6. The preparation method of glassless grain-oriented silicon steel according to claim 1, wherein during the casting slab heating, a heating temperature of the casting slab is 1150° C.

7. The preparation method of glassless grain-oriented silicon steel according to claim 1, the thickness of the oxide film formed on the surface of the strip is 1.5-2.5 μm.

8. The preparation method of glassless grain-oriented silicon steel according to claim 7, the thickness of the oxide film formed on the surface of the strip is 1.9-2.3 μm.

9. The preparation method of glassless grain-oriented silicon steel according to claim 1, wherein the component A is the mixture containing MgO and $Al_2O_3$; and in the mixture containing MgO and $Al_2O_3$, a mass ratio of the MgO and the $Al_2O_3$ is 90:5.

10. The preparation method of glassless grain-oriented silicon steel according to claim 1, wherein the low-melting-point compound with the melting point ≤ 820° C. is boron oxide or antimony oxide.

11. The preparation method of glassless grain-oriented silicon steel according to claim 1, wherein the separator comprises the component A, the component B, the component C, the component D, and $NH_4Cl$; and in the separator, a mass ratio of the component A, the component B, the component C, the component D, and the $NH_4Cl$ is 100:3:2:5:1.9.

12. The preparation method of glassless grain-oriented silicon steel according to claim 1, wherein the component A is the mixture containing MgO and $Al_2O_3$; the component B is $MgCl_2$: the component C is antimony oxide; and the component D is $Ca(OH)_2$.

13. The preparation method of glassless grain-oriented silicon steel according to claim 1, wherein the complexing agent for Fe ions is ammonium citrate.

14. The preparation method of glassless grain-oriented silicon steel according to claim 1, wherein the casting slab comprises, in mass percentage, C: 0.05-0.09%, Si: 2.9-4.6%, Mn: 0.05-0.20%, S: 0.005-0.020%, Als: 0.0225-0.0325%, N: 0.0045-0.0145%, Sn: 0.01-0.30%, Sb: 0.002-0.15%, Cr: 0.01-0.5%, Cu: 0.01-0.8%, and remainder: Fe and inevitable impurity elements.

15. The preparation method of glassless grain-oriented silicon steel according to claim 1, wherein the casting slab comprises, in mass percentage, C: 0.06-0.07%, Si: 3.2-3.5%, Mn: 0.16-0.17%, S: 0.015-0.019%, Als: 0.028-0.030%, N: 0.012-0.013%, Sn: 0.10-0.20%, Sb: 0.09-0.11%, Cr: 0.3-0.4%, Cu: 0.1-0.3%, and remainder: Fe and inevitable impurity elements.

* * * * *